Nov. 17, 1964  C. O. LEYDIG ETAL  3,157,016
TREE TOPPER WITH RECIPROCATING CUTTER BOOM
Filed May 2, 1963  4 Sheets-Sheet 1
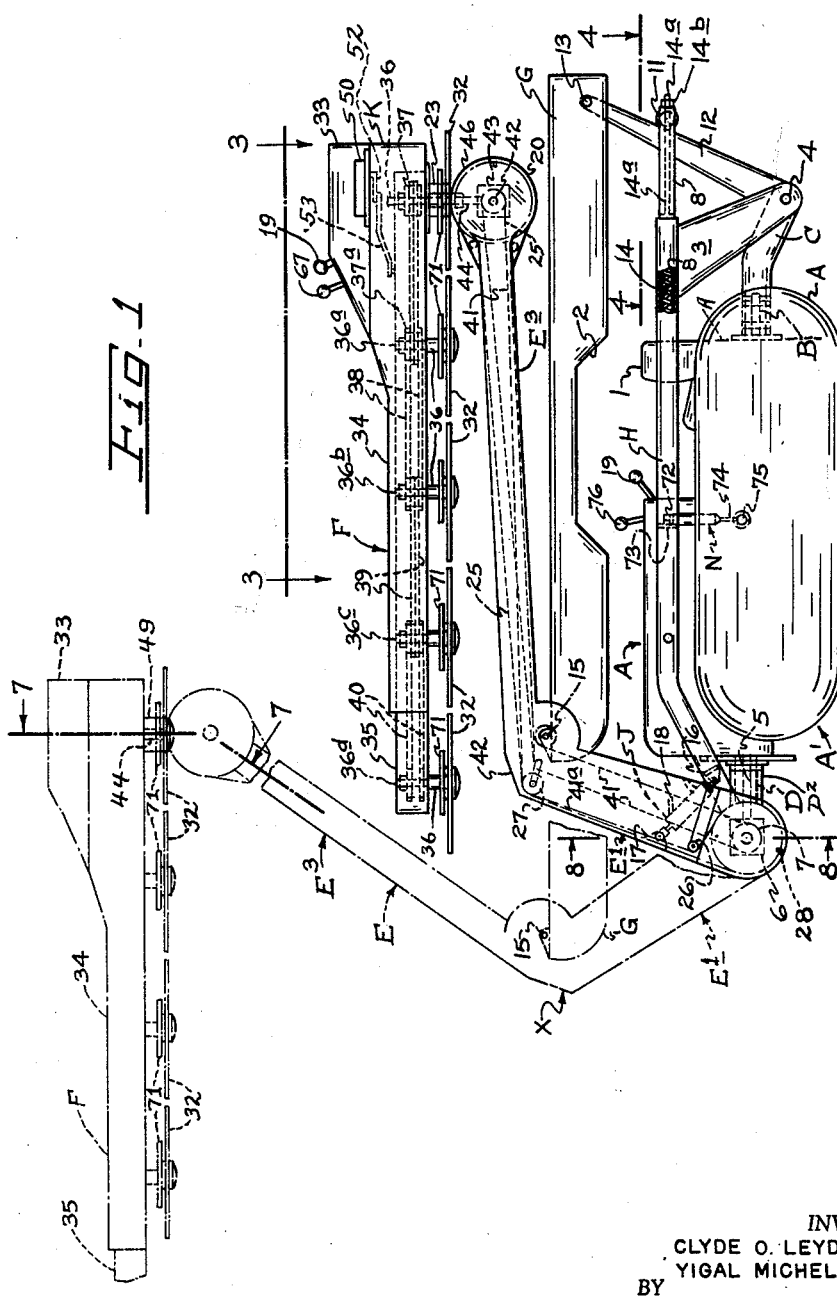
INVENTORS
CLYDE O. LEYDIG
YIGAL MICHELSON
BY
William R. Piper
ATTORNEY

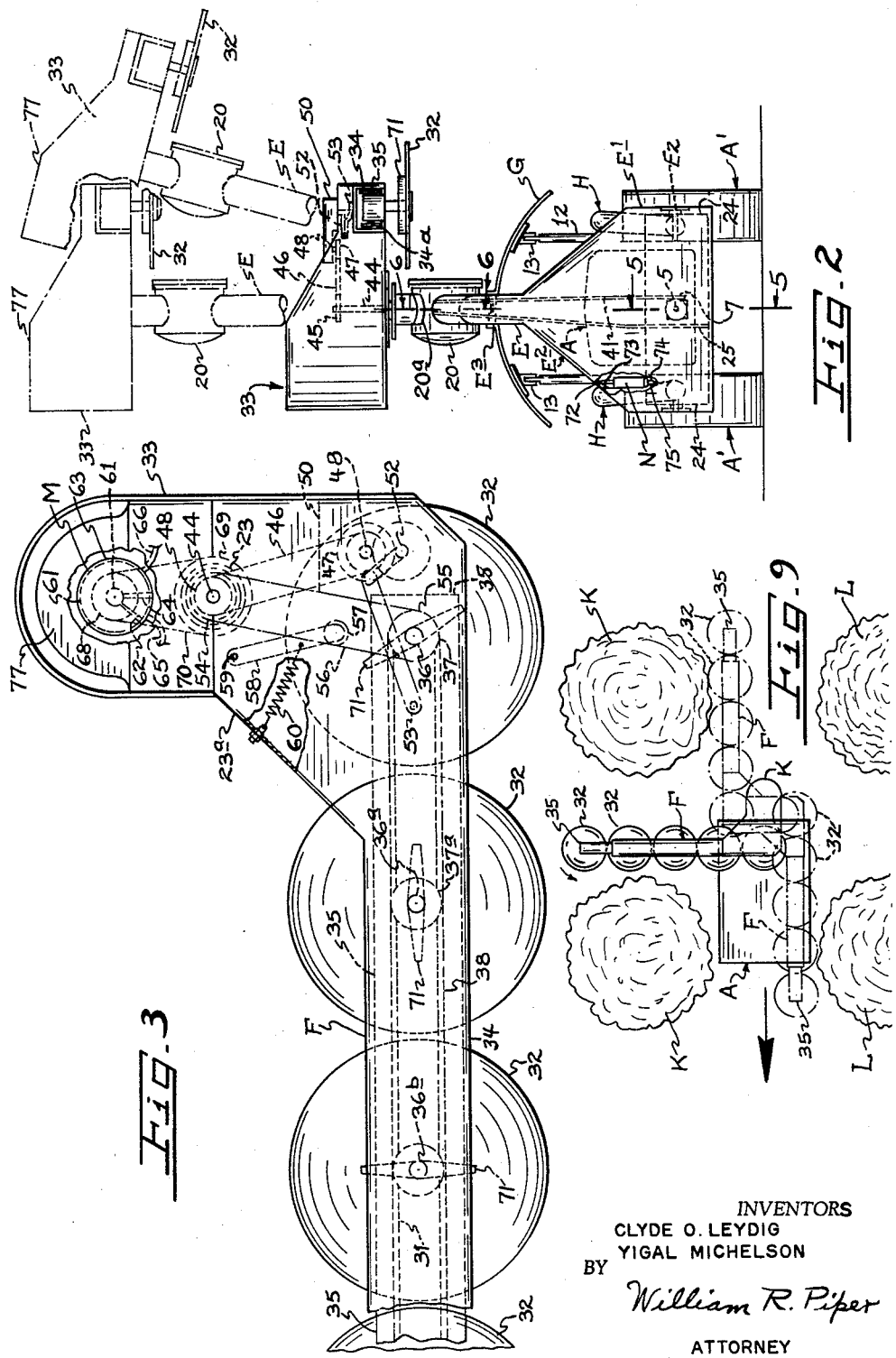

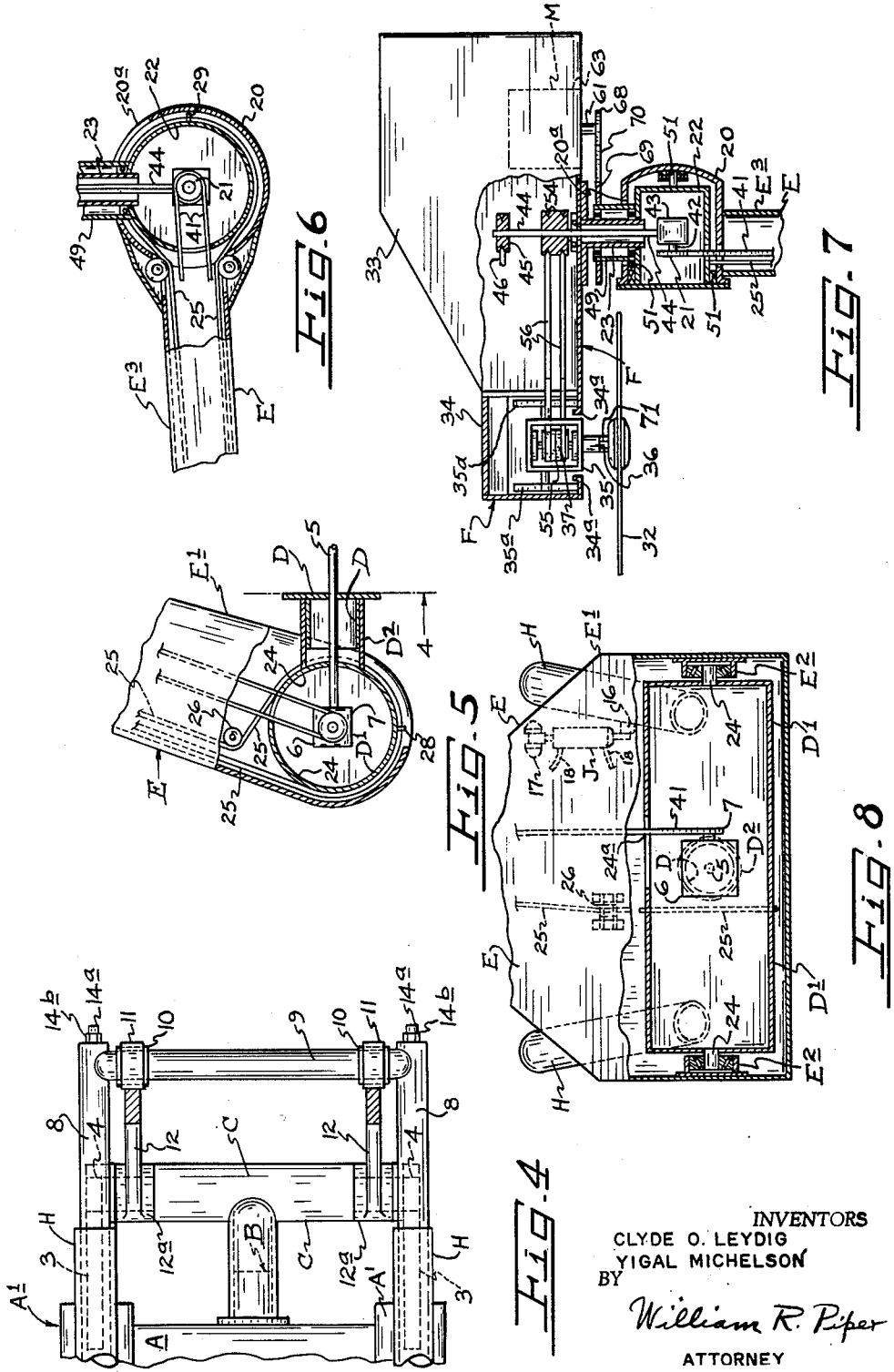

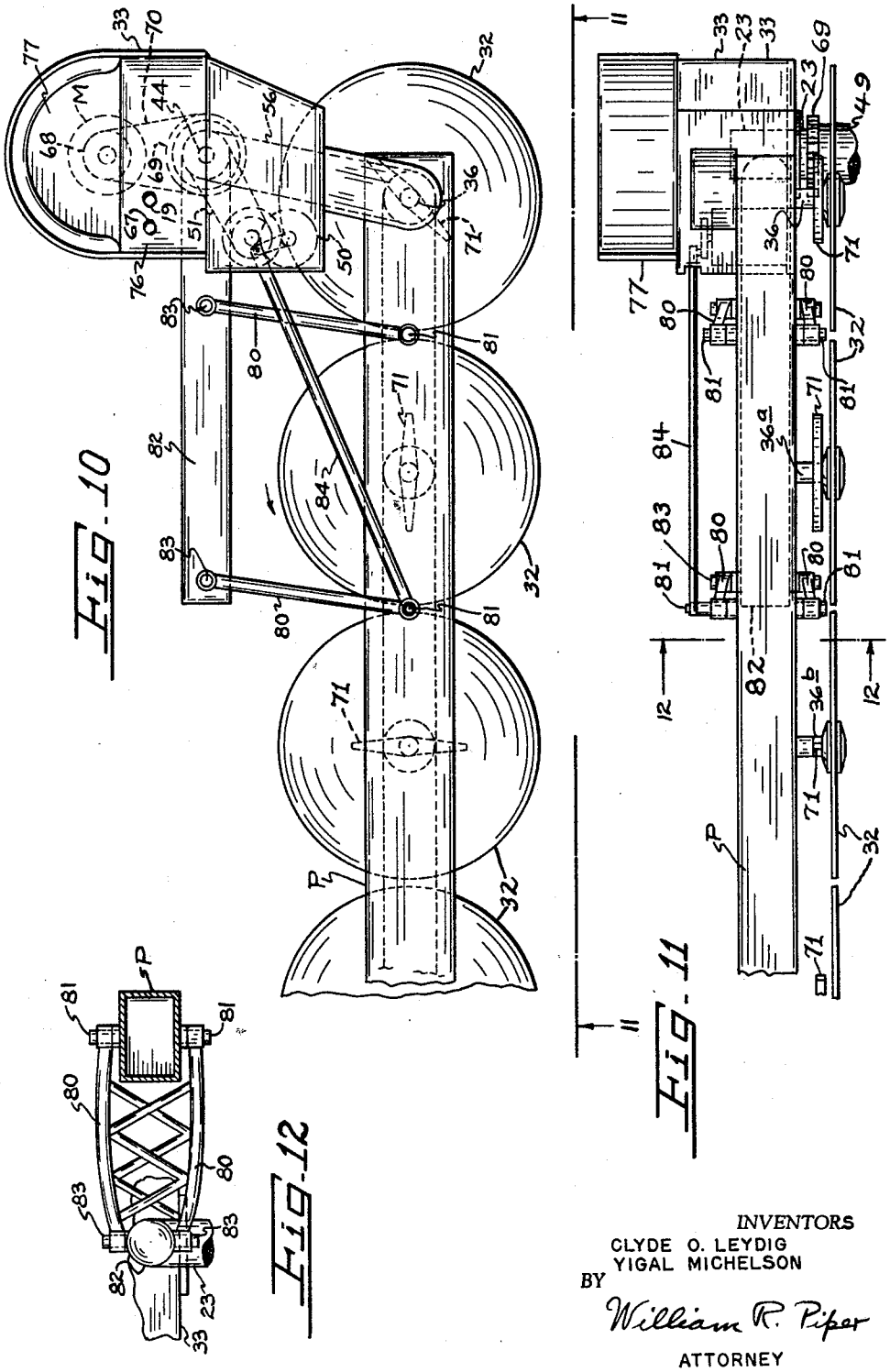

United States Patent Office 3,157,016
Patented Nov. 17, 1964

3,157,016
TREE TOPPER WITH RECIPROCATING
CUTTER BOOM
Clyde O. Leydig and Yigal Michelson, both of
P.O. Box 276, Exeter, Calif.
Filed May 2, 1963, Ser. No. 277,534
14 Claims. (Cl. 56—235)

The present invention relates to improvements in a tree topper with a reciprocating cutter boom and it consists in the combinations, constructions and arrangements hereinafter described and claimed.

An object of our invention is to provide a tree topper with a reciprocating cutter boom that may be attached to a standard powered vehicle such as an endless track-laying tractor and that has a tower which may be pivoted to the front of the tractor and swing about a horizontally disposed and transversely extending axis, this tower supporting at its outer end a horizontal reciprocating cutter boom that carries a plurality of large-diameter circular disc saws which are arranged in a single line. The peripheries of the disc saws lie close to each other so that in effect a cutting line is provided that has an effective length substantially equal to the sum of the diameters of all of the disc saws.

A further object of our invention is to provide a device of the type described in which novel means is used for maintaining the cutter boom in a horizontal position regardless of the particular angular position of the raising and lowering tower that supports the cutter boom. We further provide novel means for swinging the horizontal cutter boom about a vertical axis so that the operator can swing the cutter boom from inoperative position where the length of the boom parallels the longitudinal axis of the tractor, into an operative position where the cutter boom will extend at an angle to the tractor and project into the row of trees that are to be topped. We also provide means for swinging the tower in a lateral direction with respect to the tractor and this will cause the horizontal cutter boom to be inclined at an angle when the cutter boom extends transversely to the row of trees being topped.

Still a further object of our invention is to provide a device of the type described in which the weight of the tower and cutter boom are substantially counterbalanced by the force exerted by heavy coil springs and a part of the counterbalancing mechanism includes a bar that extends the full length of the tractor and is spaced above the driver's seat on the tractor so as to also act as a guard for the operator. The bar is shaped like a cover or canopy for the tractor and it will protect the operator, while in the driver's seat, from falling objects.

A modified form of our invention shows a different mechanism for reciprocating the cutter boom.

Other objects and advantages will appear as the specification continues. The novel features of the invention will be set forth in the appended claims.

Drawings

For a better understanding of our invention, reference should be made to the accompanying drawings, forming part of this specification in which:

FIGURE 1 is a side elevation of the device as shown applied to a tractor or other powered vehicle and illustrates the reciprocating boom in a lowered position by full lines and in a raised position by dot-dash lines.

FIGURE 2 is a front elevation of FIGURE 1 and shows the reciprocating boom in a lowered position by full lines and in an elevated position by dot-dash lines. This figure further illustrates how the reciprocating boom support can be moved so that the boom will be positioned laterally from its normal position above the tractor.

FIGURE 3 is a top plan view when looking downwardly in the direction of the arrows 3—3 of FIGURE 1 and illustrates a portion of this reciprocating boom shown on a larger scale and shows how the boom is formed of two telescoping sections, the section carrying the disc cutter saws being reciprocated while the saws are continuously rotated.

FIGURE 4 is an enlarged horizontal section taken along the line 4—4 of FIGURE 1 and illustrates a portion of the tower raising and lowering mechanism.

FIGURE 5 is a transverse vertical section on an enlarged scale and is taken substantially along the line 5—5 of FIGURE 2.

FIGURE 6 is a transverse vertical section on an enlarged scale and is taken along the line 6—6 of FIGURE 2. Both FIGURES 5 and 6 illustrate a portion of the raising and lowering mechanism for the reciprocating boom that will hold the boom in a horizontal plane regardless of its elevation and the angle of the tower.

FIGURE 7 is a transverse vertical section on an enlarged scale and is taken along the line 7—7 of the raised dot-dash line position of the tower and reciprocating boom illustrated in FIGURE 1.

FIGURE 8 is a transverse vertical section on the same enlarged scale as in FIGURE 7, and is taken along the line 8—8 of FIGURE 1, and illustrates the pivotal connection between the tower and the tractor.

FIGURE 9 is a top plan schematic view illustrating the tractor supported boom on a smaller scale moving between two rows of trees and indicating how the reciprocating boom can be swung through an angle of substantially 180°. This rotative swinging of the boom will permit the line of rotating circular saws carried by the boom to be swung into a transverse position with respect to the direction of the line of movement of the tractor and this will cause the rotating saws to top the trees in a row of trees that parallel the direction of movement of the tractor.

FIGURE 10 is a top plan view of a modified form of the reciprocating boom shown on the same scale as FIGURE 3.

FIGURE 11 is a front elevation of FIGURE 10 when looking in the direction of the arrows 11—11 of FIGURE 10.

FIGURE 11 is a vertical transverse section taken along the line 12—12 of FIGURE 11.

Detailed Description

In carrying out our invention we make use of a tractor A or other powered vehicle. This tractor has a longitudinally extending rear trunnion bearing indicated generally at B in FIGURES 1 and 4 and this bearing is centrally disposed between the sides of the tractor. A rear T-shaped support C, is rockably mounted on the bearing B. The transversely extending head of the T-shaped support C has laterally projecting trunnions 4. Arms 12 have cylindrical bearings 12a, at their lower ends and these bearings are rockably mounted on the trunnions 4, see FIGURE 4. The purpose for the arms 12 will shortly be described.

At the front of the tractor we provide a longitudinally extending cylindrical power take-off housing indicated generally at D, see FIGURES 1, 5 and 8. A T-shaped cylindrical front member D1 is shown having a rearwardly extending cylindrical portion D2 and this portion is rockably mounted on the cylindrical power take-off housing D that extends forwardly from the center of the tractor, see FIGURE 5. The transversely extending cylindrical portion of the T-shaped member D1 is provided with laterally extending trunnions 24 at its ends.

An L-shaped tower E, is hollow and it has an enlarged base or front E1, see FIGURES 2, 5 and 8. The sides of the base E1 carry bearings E2, and these receive the trunnions 24, see FIGURE 8, that extend laterally from the front T-shaped support D1. The transversely extending cylindrical portion D1 extends across the front of the tractor A. We will explain hereinafter how the front T-shaped support D1 can have its central and rearwardly-extending hollow stem D2 rock on the cylindrical housing D when the operator wishes to swing the tower E laterally in either direction.

The tower E supports a reciprocating horizontal cutter boom indicated generally at F that is used for topping trees or other objects. It will be seen from FIGURE 1 that the L-shaped tower E has a hollow elongated tubular portion E3. The reciprocable horizontal boom F has a length substantially greater than the length of the tractor although we do not want to be limited to any exact length. The horizontal boom F is supported at one end by the free end of the L-shaped tower E. This structure of the tower and boom is heavy and it would require considerable force to lift both in order to move the reciprocating boom F into the dot-dash line raised position shown in FIGURE 1.

We provide novel means for counter-balancing the weight of the tower E and boom F so that less power will be required to raise and lower them. A part of the counter-balancing mechanism for the tower and boom includes a guard and leveling bar G, see FIGURE 1, this bar remaining substantially in a horizontal position throughout its entire movement and being curved so as to perform the additional function of acting as a cover for the tractor operator who sits in a seat 1. The guard and leveling bar G is placed a sufficient distance above the seat 1 so as to give head room for the tractor operator while he is seated. FIGURE 2 illustrates how the guard and leveling bar G is in the shape of an arcuate shield and FIGURE 1 shows one side of the shield as having a cut-out or recessed portion 2 so that the operator can readily gain access to the tractor seat.

In FIGURES 1, 4 and 8, we show two spring cage housings H each of which comprises a tubular member that has an arm 3 secured to the rear end thereof and depending therefrom. The lower ends of the arms 3 are mounted on the trunnions 4 that extend transversely from the rear T-shaped support C. The front end of each spring cage housing H is welded to the transversely-extending hollow drum-shaped portion D1 of the front T-shaped support D1. The spring cage housings H extend along opposite sides of the tractor A.

Within each spring cage housing H we mount a telescoping cylindrical member 8, see FIGURES 1 and 4. The members 8 have their rear ends interconnected by a transverse cylindrical bracing member 9, see FIGURE 4. The member 9 carries bearings 10 and these bearings rotatably carry sleeve-like rollers 11. FIGURE 1 as well as FIGURE 4 illustrate the rollers 11 as engaging with the rear edges of the arms 12. The lower ends 12a of these arms 12 rock on the trunnions 4 and have their other ends pivotally secured at 13 to the guard and leveling bar G.

One or more heavy coil springs 14 are mounted in the cylindrical members 8 and have their right hand ends attached to screws 14a, see FIGURE 1. The screws 14a project through openings provided in the closed right hand ends of the hollow members 8. Nuts 14b, see FIGURE 4, are mounted on the exposed ends of the screws 14a and these nuts may be turned for varying the tension on the springs. The left hand ends of the coil springs 14 extend beyond the inner ends of the members 8 and are anchored to the interior of the housings H. They will exert tremendous force on the cylindrical members 8 tending to retract these members into the housings H. This pull on the cylindrical members 8 by the springs 14, will urge the members into the housings and will keep the rollers 11 in contact with the arms 12 and tend to swing the arms in a counter-clockwise direction on the trunnions 4 when looking at FIGURE 1.

The front end of the guard and leveling bar G is pivoted to the L-shaped tower E at 15. It will be seen from this that the pull of the springs 14 on the members 8 will tend to swing the arms 12 to the left in FIGURE 1 and this will tend to move the guard and leveling bar G to the left and to swing the tower E upwardly from the full line into the dot-dash line position in FIGURE 1. During this movement the guard and leveling bar G will remain substantially in a level position and will also be kept at a safe distance above the head of the tractor operator so as to not interfere with him. The springs 14 counter-balance the weight of the tower E and reciprocating boom F.

We provide a simple means for swinging the L-shaped tower E from inoperative to operative position and this can be by any means desired such as by hydraulic cylinders J. These cylinders are pivotally connected to brackets 16 which in turn are secured to the spring cage housings H, see FIGURES 1, 2 and 8. The piston rods of these hydraulic cylinders J are pivotally connected to brackets 17 which in turn are carried by the L-shaped tower E. Hydraulic lines 18, see FIGURE 8, extend from the hydraulic cylinders J to a source of hydraulic fluid under pressure, not shown, and to a control lever 19 which is placed in front of the driver's seat 1. The operator seated in the casing or "dog house" 33 can control the raising and the lowering of the tower E by controlling the hydraulic fluid to the cylinders J. As already stated, the principal weight of the tower E and boom F are counter-balanced by the tension of the springs 14 and therefore it requires far less force by the hydraulic cylinders J to raise and lower the tower. Only one hydraulic cylinder J is shown in FIGURES 2 and 8, but two are used.

In FIGURES 1, 3 and 7, we show the horizontal reciprocating cutter boom F and casing 33 connected to the L-shaped tower E and further illustrate how the reciprocating boom F is maintained in a horizontal position regardless of its up and down movements. The L-shaped tower E has a transversely-extending drum-shaped outer end, see FIGURE 6. This drum-shaped housing 20 rotatably carries an inner drum 22, see FIGURE 7, whose outer periphery is concentric with and spaced inwardly from the drum-shaped housing 20. A cylindrical support 23 for the horizontal reciprocating boom F and casing 33 has its cylindrical portion rotatably mounted in a non-rotatable tubular member 49, which in turn has its lower end welded or otherwise secured to the inner drum 22. The support 23 is shown in FIGURE 7 as having a flange that is connected to the casing 33 which in turn carries the horizontal boom F. The support 23 is strong enough to carry the entire weight of the boom and its lower end projects into the interior of the inner drum 22. The non-rotatable tubular member 49 extends radially from the axis of the inner drum 22 and it extends through an arcuate slot 20a provided in the drum-shaped outer end 20 of the tower E. Bearings 51 rotatably support the inner drum 22 within the outer drum-shaped end 20.

The transversely extending cylindrical portion of the front T-shaped support D1 is held against rotation about its transverse axis because the stem portion D2 mounted on the member D prevents this, see FIGURE 5. An endless cable 25 is wrapped around the cylindrical portion D1 and is passed over pulleys 26 and 27 (note the pulley 27 in the tower E in FIGURE 1), and then extends up through the tubular extension E3 of the tower and is passed around the periphery of the inner drum 22 disposed in the housing 20, see FIGURES 6 and 7. FIGURE 5 illustrates the cable 25 as being anchored to the transverse cylindrical portion D1 at 28. In FIGURE 6 the cable 25 is indicated as being anchored to the inner drum 22 at 29.

It will be seen from this construction that as the tower

E is swung counter-clockwise in FIGURE 1 from the full line position into the dot-dash line position, the member D1 will remain stationary and will not rotate about its transverse axis. Therefore as the tower E swings to the left in FIGURE 1, the endless cable 25 will cause the inner drum 22 to rotate just sufficiently to maintain the vertical axis of the cylindrical support 23 and the outer non-rotatable tubular member 49 in a vertical position at all times. The drum-shaped outer end 20 of the tower E is provided with the slot 20a along which the tubular member 49 can move during the raising and lowering of the tower.

We have explained how the cylindrical support 23 and tubular member 49 are maintained in a vertical position regardless of the swinging of the tower E. Before describing how the power is transmitted from the power take-off shaft 5 to the circular saws 32 which are carried by the horizontal reciprocating boom F, it is best to set forth at this time the structure of the horizontal boom and how it supports the circular saws. In FIGURES 1 and 7, the cylindrical support 23 is illustrated as being connected to the horizontal boom F by the flange at the upper end of the support. In these figures the casing 33 is shown connected to the cylindrical support 23 and this casing carries an inverted U-shaped member 34 that has inwardly extending flanges 34a that in turn support a reciprocable saw-carrying member 35.

Both FIGURES 2 and 7 indicate how the reciprocable saw carrying member 35 is supported by the inwardly turned flanges 34a and how it is possible for the member 35 to be moved back and forth in the direction of its length. The member 35 is supported by wheels 35a that ride on the rail-like flanges 34a. The wheels 35a are made large enough in diameter to have the upper portions of their peripheries spaced a slight distance from the inner surface of the top of the inverted channel member 34. The wheels 35a will prevent any appreciable vertical movement between the saw-carrying member 35 and the U-shaped member 34 while permitting reciprocation of the member 35. FIGURES 1 and 3 illustrate the member 35 projecting beyond one end of the inverted channel-shaped supporting member 34. We have shown five circular saws 32 rotatably carried by the member 35. It is possible to have a larger or a fewer number of saws without departing from the spirit of the invention. The saws are supported by vertical shafts 36 and the shafts in turn are rotatably carried by the reciprocable saw-carrying member 35 and extend below the member. The shafts 36 are arranged along a single line that parallels the longitudinal axis of the member 35.

FIGURES 1 and 7 show how the right hand shaft 36 carries a pulley 37. FIGURE 1 then shows that this pulley 37 is connected by means of endless belts to a second pulley 37a mounted on the next shaft 36a which is disposed near to the shaft 36. A double pair of belts and double pulleys, indicated generally at 38, operatively connect the second shaft 36a to a third shaft 36b. A double belt and double grooved pulley connection 39 operatively connects the vertical shafts 36b and 36c together. The outermost vertical shaft 36d is connected to the shaft 36c by a double belt and pulley connection indicated generally at 40. Any operating means between the various shafts 36 to 36d inclusive for causing them to rotate in unison will suffice. We have indicated double belts and pulleys as one means of drive connections between the various shafts. The double belts not only give a better drive than a single belt, but they will balance the pull between the various shafts.

The circular saws 32 carried by the shafts have their peripheries lying very close to one another so that a single cutting action throughout the entire length of the series of circular saws will be effected by the rotation of the saws at high speeds and by the fact that the saw peripheries almost contact each other. The reciprocation of the member 35 by a means presently to be described will cause the saws to produce a clean cutting edge as the saws are moved across the tops of the trees for topping them.

We will now describe the mechanism for rotating the circular saws 32 and at the same time reciprocating the member 35 that carries the saws. In FIGURES 1 and 5, we show the drive or power take-off shaft 5 from the tractor A entering a housing 6 that encloses bevel gears, not shown. The housing 6 is supported within the cylindrical member D1 by any means, not shown. A sprocket 7 is rotated by the bevel gears in the housing 6, and a sprocket chain 41 extends from the sprocket 7 and passes through an opening 24a in the member D1, see FIGURE 8. The two reaches of the endless sprocket chain 41 extend through the hollow tower E and connect with a sprocket 21 housed in the inner drum 22, see FIGURE 6. In FIGURE 7, the sprocket 21 is shown keyed to a shaft 42 that in turn enters a housing 43. The housing 43 is supported within the inner drum 22 by any means, not shown. This housing encloses meshing bevel gears, not shown, which operatively connect the shaft 42 with a shaft 44. It will be seen from this construction that a rotation of the power take-off shaft 5 will rotate the shaft 44 in FIGURE 7, regardless of the angular position of the boom F with respect to the tower E.

FIGURES 2 and 7 show the vertical shaft 44 carrying a pulley 45. A belt 46 connects the pulley 45 to a second pulley 47 that is mounted on a shaft 48, see FIGURE 2. The shaft 48 connects with a gear reduction mechanism indicated generally at 50. The gear reduction 50 is of a standard construction and a crank arm 52 will be rotated at a much slower speed by it, see FIGURE 3. A pitman 53 is pivotally connected to the crank arm 52 and has its other end connected to the reciprocating member 35 for reciprocating it. It will be seen from this construction that a rotation of the power take-off shaft 5 will cause the member 35 to reciprocate in the horizontal boom F.

The vertical shaft 44 is operatively connected to the saw-carrying shafts 36. The shaft 44 carries a double-grooved pulley 54, see FIGURE 7. Another double-grooved pulley 55 is mounted on the shaft 36 and the connection is by means of double endless belts 56. An idler double-grooved pulley 57, see FIGURE 3, is mounted on an arm 58 that is pivoted at 59 to the casing 33. A spring 60 is connected to the arm 58 and to the casing 33 and urges the double-grooved pulley 57 against the dual endless belts 56 to take up any slack in them during the reciprocation of the saw-carrying member 35. This construction causes the double-grooved pulley 56 to be operatively connected to the double-grooved pulley 55 on the shaft 36 even though the shaft 36 is reciprocated with the reciprocation of the member 35. The drive shaft 5 operates at a high speed and therefore the shaft 36 will also be rotated at a high speed. As already stated the shaft 36 is operatively connected to the other shafts 36a, 36b, 36c and 36d, by the endless belts mentioned and these will rotate the circular saws 32 at a high speed. We are using circular saws approximately thirty-six inches in diameter although we do not wish to be confined to any exact measurement.

In the diagrammatic view of FIGURE 9, we show how the reciprocable boom F can be swung into various angular positions with respect to the tractor A. The tractor is indicated as moving to the left in this figure between two rows of trees K and L. The reciprocable boom F is shown in full lines as extending at right angles to the direction of travel of the tractor A and the rotating circular saws 32 will provide a cutting edge from the center line of the tractor to a point that will extend further out than the outer circumferences of the trees in the row K that are to be topped.

It is possible to swing the reciprocating boom F in a counter-clockwise direction from the full line position shown in FIGURE 9 so that the longitudinal axis of the boom will parallel the longitudinal axis of the tractor.

It is further possible to swing the reciprocating boom F in a clockwise direction from the full line position shown so that it will extend rearwardly from the tractor. In either case the boom will be moved into inoperative position so far as the trees K are concerned and the tractor can proceed along the path between the two rows of trees K and L.

In FIGURE 3, we show a mechanism for swinging the boom into any desired angular position from the two extreme positions shown by the dot-dash lines in FIGURE 9. A hydraulic control unit M, see also FIGURE 7, is mounted in the casing 33 and it is in the form of a closed cylinder with a rotatable shaft 61 extending along the axis of the cylinder. A vane 62 extends radially from the shaft 61 and has its outer edge slidably contacting with the inner surface of the cylinder 63 of the hydraulic control unit M. A stationary baffle vane 64 extends inwardly from the cylinder 63 in a radial direction and terminates so as to contact with the periphery of the shaft 51.

A hydraulic line 65, see FIGURE 3, leads from a source of hydraulic fluid under pressure, not shown, and connects with the interior of the cylinder 63 to one side of the stationary vane 64. A second hydraulic line 66 extends from the high pressure source of hydraulic fluid, not shown, and connects with the cylinder 63 at a point at the right hand side of the vane 64. A control handle 67 is placed near the operator's seat 77 on top of the casing 33 of the tractor A, see FIGURE 1. This control handle when moved in one direction will control means, not shown, for delivering hydraulic fluid under pressure through the hydraulic line 65 into the cylinder 63 and between the stationary vane 64 and the movable vane 62. The casing 33 in FIGURE 1 encloses the operator's seat 77 which is not shown in this figure.

The entrance of the fluid into the cylinder 63 will swing the movable vane 62 in a clockwise direction and this will rotate the shaft 61 in the same direction. The fluid in the cylinder 63 and in advance of the movable vane 62 will flow out through the hydraulic line 66 and back to the source, not shown. When the operator moves the control handle 67 in the opposite direction from neutral position, a reverse flow will take place and hydraulic fluid will enter the cylinder 63 through the hydraulic line 66 and will leave the cylinder through the hydraulic line 65. Since the hydraulic line connects with the cylinder 63 at a point between the movable vane 62 and the stationary vane 64, this reverse flow of fluid will cause the vane 62 to rotate in a counter-clockwise direction and to rotate the shaft 61 counterclockwise.

Again referring to FIGURES 3 and 7, it will be seen that the shaft 61 projects below the bottom of the cylinder 63 and carries a sprocket 68. The non-rotatable tubular member 49 extends radially from the inner drum 22, see FIGURE 7, to which it is rigidly connected. A sprocket 69 is mounted on the outer end of the tubular member 49. This sprocket is operatively connected to the sprocket 68 by a sprocket chain 70. It will be seen from this construction that since the sprocket 69 cannot rotate, then a movement of the vane 62 in the cylinder 63 will rotate the shaft 61 and the sprocket 68 and therefore the hydraulic unit M will either swing the reciprocating boom F counter-clockwise or clockwise from the full line position shown in FIGURE 9, this depending upon the direction in which the vane 62 is moved in the cylinder. The parts are so designed that the extreme limits of the swinging movement of the reciprocating boom F will be between the two dot-dash line positions shown in FIGURE 9. If desired the boom F can extend at an angle with respect to the tractor A which is less than the angle shown by the full-line position indicated. The rotation of the circular saws 32 will be counter-clockwise when looking at FIGURE 9 and therefore the material cut from the tops of the trees by the saws will be moved toward the passage that lies between the two rows of trees K and L.

In FIGURE 1, we show beaters 71 that are rigidly mounted on the shafts 36, 36a, 36b, 36c and 36d, and these beaters are arranged adjacent to the upper surfaces of the circular saws 32. The beaters are rotated with the saws and their arms will aid in moving the cut material from the trees K toward the aisle between the trees K and L that is occupied by the tractor A. In this way the cutting discs are self-cleaning in that the greater, if not all, of the cut material from the tree tops will be removed from the tree tops during the cutting operation.

In the operation of the device it will be seen that the angular shape of the tower E when the tower is in raised position, shown by the dot-dash lines in FIGURE 1, will tend to guide any tree branches, striking the tower, away from the tractor A. FIGURE 2 shows how the base portion E1 of the tower is much wider than the elongated portion E3. The elongated portion E3 will be the first to strike any tree branches and the rearwardly inclined slant of this tower portion will tend to spread any branches that might contact it. A path will be made for the tractor A to follow. The base portion E of the tower is inclined rearwardly and downwardly from the point X in FIGURE 1, when the tower is in raised position and this base portion will deflect any tree branches or other items that it might contact and will move these branches to the sides of the tractor and thus permit the tractor to move along the path between the rows of trees.

It is possible to tilt the tower E laterally as shown by the double dot-dash lines in FIGURE 2. Since the base of the tower E and its T-shaped support D1 can rock on the tractor supported cylindrical bearing D in a lateral direction, and since the rear T-shaped support C can be rocked on the rear bearing B, the entire device comprising the tower E and boom F can be rocked about the aligned axes of the rear bearing B and the front bearing D as a unit.

The mechanism for rocking the tower E, laterally, comprises two hydraulic cylinders N, mounted on each side of the tractor, see FIGURES 1 and 2. The cylinders are pivoted at 72 to brackets 73 which are mounted on the two spring cage housings H. The piston rods 74 projecting from the hydraulic cylinders N are pivotally connected to brackets 75 that in turn are secured to the tractor A. A hydraulic control handle 76 is mounted near the driver's seat 1 and it may be operated by the driver for connecting the hydraulic fluid under pressure, not shown, to the desired one of the hydraulic cylinders N for moving the piston rod 74 and acting on the associate housing H to swing the tower E into an inclined position.

In FIGURE 2, we show the cylinder N on the left hand side of the tractor (although there is a like cylinder mounted on the right side of the tractor) and when fluid is admitted to this cylinder by the operator actuating the control handle 76, the associate housing H will be raised and will swing the tower E to the right. At the same time hydraulic fluid from the cylinder N on the right hand side of the tractor A in FIGURE 2, not shown, will permit the piston rod associated with this cylinder to retract and thus permit this lateral swinging movement. The purpose of the swinging of the tower E to the right or to the left is to incline the reciprocating boom F upwardly or downwardly at an angle when cutting the tops of trees.

The casing 33 carries the operator's seat 77. This operator can be provided with dual controls similar to the controls 19, 67 and 76 and placed adjacent to the operator's seat 77 for operating the mechanism in exactly the same manner as already described. The operator in the seat 77 will have a better view of the operation than the operator that drives the tractor.

In FIGURES 10, 11 and 12, we show a modified form of the reciprocating cutter boom. Instead of the saw-carrying member 35 reciprocating within the horizontal boom F, we disclose a saw-carrying member P in FIGURE 10. This member is supported by arms 80 which are pivotally secured to the member P at 81 and are pivotally connected to a supporting member 82 at 83. The member 82 is supported by the tubular member 23 and it carries the casing 33, see FIGURES 10 and 12.

The means for rotating the circular saws 32 in FIGURE 10 will be the same as that already described. The saw shaft 36 is connected to the drive shaft 44 by the belt and pulley connection 56. This will cause the saws to rotate in a counter-clockwise direction in FIGURE 10. The gear reduction mechanism 50 in FIGURE 10 will be operated by the shaft 44 and the pulley and belt connection 51. Instead of the pitman 53 connecting the gear mechanism 50 with the reciprocating member 35 of FIGURE 3, we show an elongated pitman 84 in FIGURE 10, that is reciprocated by the gear reducing mechanism 50 and is pivotally connected to the saw carrying member P at one of the pivot points 81. It will be seen from this construction that as the pitman 84 is reciprocated it will reciprocate the member P and the arms 80 will swing about their pivots 81 and 83 and permit the member P to reciprocate with respect to the support 82.

The hydraulic control unit M will function in the same manner in FIGURE 10 as it does in FIGURE 3. The control unit M will swing the support 82 into the desired angular position with respect to the tractor A, not shown, in FIGURES 10, 11 and 12. The swinging of the support 82 will permit it to swing with the cylindrical support 23. The circular saws 32 have their shafts 36, 36a, 36b, 36c and 36d provided with the beaters 71. Both the seats 1 and 77 can have duplicate control handles 19, 67 and 76 shown in FIGURE 1. In this way either the operator sitting in the seat 1 or the operator sitting in the seat 77 can have control of the operation of the boom and associate parts.

It will be seen from FIGURE 1, that as the tower E is swung into a raised position so as to lift the cutter boom into operative position, the combined cover and bar G will have its front end move in front of the front end of the tractor A, as shown by the dot-dash line position in this figure. The radiator, not shown, of the tractor is positioned at the front end of the tractor. Therefore the front portion of the combined cover and bar G will act as a roof for protecting the tractor radiator and front end of the tractor from brush and tree branches that have been cut by the rotating and reciprocating saws carried by the boom F.

The cut away portion 2 in the combined cover and bar G, is on the side of the cover that is disposed opposite to the reciprocating cutter boom F when the latter is operating to cut branches from trees. This will give the operator who is in the seat 1, the protection he needs during the tree-trimming operation. When the tower E is in raised position, it will first receive any cut brush or limbs that might fall upon the tractor. The tower will tend to part the falling limbs and cause them to drop on both sides of the roof G where they will fall to the ground rather than drop onto the middle of the roof where they might otherwise lodge. The cut branches on striking the inclined portion of the tower E3 will be swung into inclined positions and will strike the roof G in such inclined angles. Therefore the cut branches will slide off from the downwardly curved sides of the cover G rather than pile up on the mid portion of the cover.

If the tower E were placed at the rear end of the tractor, it would tend to collect the cut and falling tree branches and aid in piling them up on the roof G. The cut material would have to be removed from the tractor roof G from time to time. The placing of the tower E at the front of the tractor and the inclining of the upper portion of the tower in an upward and rearward direction will prevent the piling up of the cut material on the cover G.

We claim:
1. In a device of the type described:
   (a) a support;
   (b) a reciprocating boom carried by said support;
   (c) a plurality of disc saws rotatably carried by said boom and having their axes paralleling each other and arranged in a single plane, and the planes of the saws coinciding with a single plane that is normal to the saw axes; and
   (d) means for simultaneously rotating said saws about their axes and for reciprocating said boom for moving said saws in a plane that substantially parallels said single plane that extends through all of said saw axes.
2. The combination as set forth in claim 1: and in which
   (a) the means connecting said reciprocating boom to said support includes substantially parallel arms that are pivotally connected at one of their ends to said support and have their other ends pivotally connected to said boom; the arms, support and boom forming a parallelogram;
   (b) said boom reciprocating means causing movement of said boom through a short distance so that said arms that support said boom will swing through a small arc that will cause said boom to reciprocate in substantially a straight line.
3. The combination with a powered vehicle: of
   (a) a substantially L-shaped tower that has a lower leg pivotally connected to said vehicle; and an upper leg extending in a substantially horizontal line and lying over the top and along the length of said vehicle when said tower is in lowered position;
   (b) a saw-carrying boom pivotally connected to the free end of said upper tower leg and lying in a substantially horizontal plane disposed directly above and close to said upper tower leg when said tower is in its lowered position;
   (c) means for swinging said tower about its pivotal connection with said vehicle so as to cause said upper leg to be inclined upwardly and rearwardly at an angle from a position in front of and near the top of said vehicle and including means for maintaining said boom in a substantially horizontal plane during the swinging movement of said tower;
   (d) said boom supporting a reciprocable saw-carrying member;
   (e) a plurality of disc saws rotatably carried by said member and having their axes paralleling each other and arranged in a single plane, and the planes of said saws coinciding with a single plan that normally lies in a horizontal position and is normal to said saw axes; and
   (f) means for simultaneously rotating said saws about their axes and for reciprocating said saw-carrying member in a line that substantially parallels said single plane that extends through all of said saw axes.
4. The combination as set forth in claim 3: and including
   (a) means carried by said boom and operatively connected to said tower for swinging said boom for causing the plane of the saw axes to extend transversely to the length of said vehicle.
5. The combination with a powered vehicle: of
   (a) a substantially L-shaped tower that has a lower leg pivotally connected to the front of said vehicle; and an upper leg that is inclined upwardly and rearwardly at an angle;
   (b) a saw-carrying boom connected to the free end of said upper leg;
   (c) a plurality of disc saws rotatably carried by said boom for topping a row of trees along which the powered vehicle moves; and

(d) means for rotating said disc saws;

(e) said upper tower leg extending rearwardly and upwardly from the front of said vehicle so as to slip under branches of trees that might otherwise extend across the path of the moving vehicle and tower and moving these branches to one side without breaking them; the upper tower leg also causing any cut branches striking it, to be deflected toward the sides of the vehicle where they will drop upon the ground.

6. The combination with a powered vehicle: of (a) a tower having one end pivotally connected to the vehicle;

(b) a saw-carrying boom connected to the free end of said tower;

(c) a plurality of disc saws rotatably carried by said boom for topping a row of trees along which the vehicle moves;

(d) means for rotating said disc saws;

(e) means for swinging said tower about its pivotal connection with said vehicle for raising or lowering said saw-carrying boom;

(f) means for substantially counterbalancing the weight of the tower and saw-carrying boom so as to reduce the power necessary for said tower-swinging means to swing said tower about its pivotal support on said vehicle; and (g) means for moving said saw-carrying boom so that its longitudinal axis is parallel with the surface of the ground that supports the vehicle regardless of the angular position of said tower.

7. The combination as set forth in claim 6: and in which (a) said means that substantially counterbalances the weight of said tower and saw-carrying boom includes a bar that overlies the vehicle and is spaced thereabove, said bar overlying said vehicle whereby it will protect the vehicle and a driver who operates the vehicle.

8. The combination with a vehicle having front and rear bearings whose aligned axes parallel the length of the vehicle and are disposed substantially midway between the sides thereof: of (a) a tower-supporting member rotatably mounted on said front bearing and adapted to be rocked laterally about said axis of said front bearing;

(b) a tower pivotally mounted on said member and adapted to swing about an axis that extends at right angles to said front bearing axis;

(c) a saw-carrying boom connected to the free end of said tower and being supported thereby;

(d) a plurality of disc saws rotatably mounted on said boom;

(e) means for substantially counterbalancing the weight of said tower and boom and including (f) a substantially horizontal bar spaced above the top of said vehicle and having its front end pivotally connected to said tower at a point above the pivotal connection of said tower to said tower-supporting member;

(g) spring-actuated arms having one of their ends pivotally connected to the rear end of said bar;

(h) an arm-supporting member rotatably mounted on said rear bearing and adapted to be rocked laterally about said axis of said rear bearing;

(i) the other ends of said spring-actuated arms being pivotally connected to said arm-supporting member and being swingable about an axis that extends at right angles to said rear bearing axis; said spring-actuated arms exerting a force on said bar that will substantially balance the weight of said tower and boom caused by gravity in tending to swing the tower downwardly about its pivotal connection to said tower-supporting member;

(j) whereby said tower, bar and arms and said tower and arm-supporting members comprise a unitary structure that can swing laterally on the aligned axes of the front and rear bearings; and (k) means for swinging this unitary structure in a lateral direction about the front and rear bearing axes for moving said boom laterally by the lateral swinging of said tower.

9. The combination as set forth in claim 8: and in which (a) said horizontal bar overlying said vehicle whereby it will protect the vehicle and a driver who operates the vehicle.

10. The combination as set forth in claim 8: and in which (a) pivot means interconnecting said tower and said boom, whereby the boom may be swung laterally relative thereto; and (b) means for swinging said boom laterally with respect to said tower and into the desired angular position.

11. The combination with a powered vehicle having a front end: of (a) a tower having one end pivotally secured to the front end of said vehicle for pivotal movement in a substantially vertical plane;

(b) means for swinging said tower about its pivot;

(c) a saw-carrying boom pivotally connected at the free end of said tower and being swingable in the same plane in which said tower is swingable; and (d) means for swinging the boom with respect to said tower for positioning the boom in a substantially horizontal position regardless of the angular position of said tower with respect to said vehicle and said boom.

12. The combination as set forth in claim 11; and in which (a) means is provided for swinging said boom laterally with respect to said tower and to the plane in which said tower swings.

13. The combination as set forth in claim 12; and in which (a) means is provided for tilting said tower laterally to either side of said vertical plane in which said tower normally swings.

14. The combination as set forth in claim 13; and in which (a) a first set of control means for operating the powered vehicle is mounted on the vehicle;

(b) an operator's seat on said vehicle in a position where the operator can manipulate said control means for controlling the moving vehicle while supported by said seat;

(c) a second set of control means mounted on said boom for controlling said first mentioned tower-swinging means, said first-mentioned boom swinging means, said means that swings said boom laterally and said means that tilts said tower laterally; and (d) a second operator's seat on said boom in a position where a second operator can manipulate said second set of control means while supported by said second seat.

References Cited by the Examiner

UNITED STATES PATENTS 2,299,129   10/42   Dickenson et al. _____ 143—43
2,940,486   6/60   Whitmore _____ 143—43

T. GRAHAM CRAVER, *Primary Examiner.*

ANTONIO A. GUIDA, *Examiner.*